(12) United States Patent
Dulsey et al.

(10) Patent No.: US 6,283,675 B1
(45) Date of Patent: Sep. 4, 2001

(54) METHOD FOR OXIDATIVE DESTRUCTION OF CARBON DISULFIDE IN SOIL

(75) Inventors: Rich Dulsey, Drefher, PA (US); Marvin Mausner, Teaneck, NJ (US); Greg Bybee, Albuquerque, NM (US); Bill Mercurio, East Brunswick, NJ (US); Paul Fahrenthold, La Grange, TX (US); John Hazard, West Chester, PA (US); Chris McGhee, Krum, TX (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/322,878

(22) Filed: May 28, 1999

(51) Int. Cl.[7] ........................................................ B09B 3/00
(52) U.S. Cl. ....................................... 405/128.5; 588/242
(58) Field of Search .................................. 588/242, 205, 588/215, 218, 238; 405/128.5, 128.75; 210/751

(56) References Cited

U.S. PATENT DOCUMENTS

| | | | |
|---|---|---|---|
| 4,824,650 | * | 4/1989 | Segrist .............................. 423/321 S |
| 4,839,061 | * | 6/1989 | Manchak, Jr. et al. ............... 210/743 |
| 4,993,874 | * | 2/1991 | Klusman ............................... 405/128 |
| 5,536,898 | * | 7/1996 | Conner et al. ....................... 588/252 |
| 5,667,690 | * | 9/1997 | Doddema et al. .................... 210/631 |
| 5,755,285 | | 5/1998 | Bayer .................................... 166/269 |
| 5,840,191 | | 11/1998 | Eccles ................................... 210/601 |
| 5,868,523 | | 2/1999 | Niekell et al. ........................ 405/128 |
| 6,015,536 | * | 1/2000 | Lokkesmoe et al. ................. 423/210 |
| 6,019,548 | * | 2/2000 | Hoag et al. .......................... 588/205 |
| 6,183,708 | * | 2/2000 | Hei et al. ............................. 423/210 |

OTHER PUBLICATIONS

Derwent–Acc–No: 1978–37801A (English Abstract of RD 169016 A).*

* cited by examiner

Primary Examiner—Wayne Langel
Assistant Examiner—Eileen E. Nave
(74) Attorney, Agent, or Firm—Hoffmann & Baron, LLP

(57) ABSTRACT

A process for destroying $CS_2$ in soil by alkaline oxidation by controlledly combining reagents with $CS_2$-contaminated soil, preferably by first performing a caustic presoak with NaOH followed by stagewise addition of oxidant, preferably percarbonate, such that oxidative reagents mix with a uniform mixture of $CS_2$-contaminated soil and caustic at a rate to prevent volatization of $CS_2$. Off-gas produced by $CS_2$ oxidation is collected and oxidized. The end product soil has substantially all of its $CS_2$ oxidized.

42 Claims, 3 Drawing Sheets

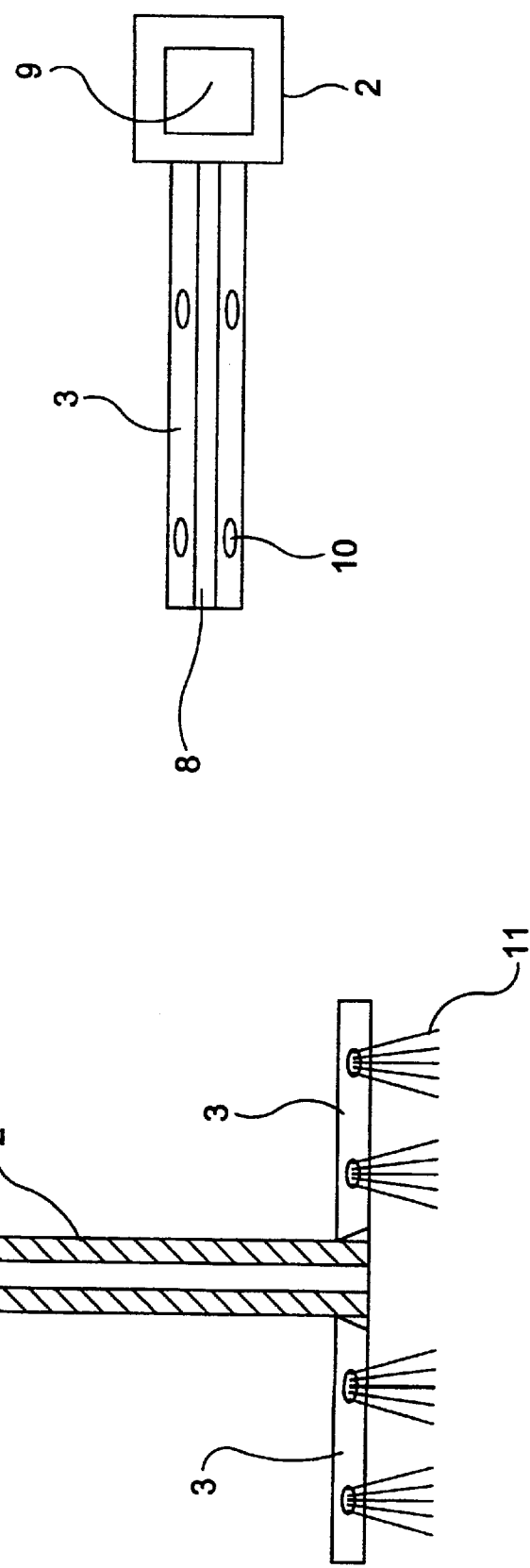

METHOD FOR OXIDATIVE DESTRUCTION OF CARBON DISULFIDE IN SOIL

BACKGROUND OF THE INVENTION

The present invention relates to a method of remediating soil contaminated with hazardous substances. More particularly, the invention relates to a method of reducing the amount of carbon disulfide ($CS_2$) in the soil through chemical oxidation.

In recent years, an increased awareness of preserving the environment has caused the Environmental Protection Agency (EPA) to take measures to counter the release or threat of release of hazardous substances from soil. The EPA investigated certain soils and determined that in some areas, there were hazardous concentrations of certain chemicals including $CS_2$. The EPA has actually issued orders to remove $CS_2$ contaminated soil.

$CS_2$ can be converted to sulfate, a nonhazardous substance, by a chemical process known as alkaline oxidation. Alkaline oxidation of $CS_2$ can be achieved with the use of a reagent containing a peroxide radical. However, oxidation of $CS_2$ is a highly exothermic reaction which can release undesirable gaseous by-products such as $H_2S$. Furthermore, the addition of oxidant to $CS_2$ can produce potentially explosive and flammable consequences.

Prior methods of remediating $CS_2$-contaminated soil included excavation of the contaminated soil. However, $CS_2$ is highly volatile and can ignite or explode when exposed to air. Excavation of soil to remove $CS_2$ creates the hazards associated with exposing $CS_2$ to air. A process to remediate $CS_2$-contaminated soil without exposing $CS_2$ to air is therefore desirable.

To date, there have been a number of methods developed to remediate contaminated soil. Examples include excavation and soil washing, electromigration, volatilization, incineration and land farming.

In addition, U.S. Pat. No. 5,868,523 describes an injection system to introduce biologicals, nutrients, water and air for bioremediation of contaminated soil and groundwater. The penetration can be both vertical and horizontal and does not disturb the soil in place. However, the '523 reference does not address remediation of $CS_2$-contaminated soil or the unique difficulties and hazards associated with handling $CS_2$.

U.S. Pat. No. 5,755,285 describes concentrating contaminants in one area of the soil and excavating the area. The technology disclosed in the '285 reference involves the use of bore holes made in the soil and injection of a medium to cause harmful substances to migrate and concentrate to a smaller soil area. Excavation work is thus reduced to a great extent. The '285 reference does not address remediation of $CS_2$-contaminated soil by treatment of the soil, nor does it address the difficulties and hazards encountered while treating $CS_2$.

U.S. Pat. No. 5,536,898 describes immobilizing organic chemical waste in soil by absorption with biogenetic amorphous silica. The '898 reference discloses the mixing of untreated particulate rubber and biogenetic amorphous silica with soils contaminated with organic compounds in order to immobilize such compounds (i.e. they are no longer reactive) sufficiently to pass EPA requirements. The '898 patent does not address remediation of $CS_2$-contaminated soil by treatment of the soil, nor does it address the unique difficulties and hazards encountered while treating $CS_2$.

Other disclosures related to degrading contaminants within the soil include U.S. Pat. No. 5,840,191, which describes microbial degradation of soil contaminants. Soil contaminated with one or more organic species and one or more metal species is first treated with microbial agents to break down the organic compounds followed by treating the same soil with microbially produced sulfuric acid to solubilize and leach the metal species as a metal sulfate, and finally bioprecipitating the metal sulfate.

Similarly, U.S. Pat. No. 5,667,690 describes breaking down organic compounds (generally hydrocarbons) in solids, water or gas by using a complex of a transition metal and a polyamine in the presence of a peroxide. These complexes are injected into the medium by a pump.

None of the technologies mentioned hereinabove address remediation of $CS_2$-contaminated soil by treatment of the soil, nor do they address the unique difficulties and hazards encountered while treating $CS_2$.

Thus, there is a need for a method to remediate $CS_2$-contaminated soil which avoids the potential hazards associated with $CS_2$ oxidation.

SUMMARY OF THE INVENTION

According to the present invention, it has now been found that $CS_2$-contaminated soil can be treated while avoiding the above-mentioned problems. Specifically, the present invention is a method of remediating $CS_2$ in soil by controlledly combining $CS_2$-contaminated soil with an oxidizing agent such that $CS_2$ contained in the soil is disposed sufficiently near the oxidizing agent to react chemically therewith at a rate and under conditions which prevent volatilization of the $CS_2$. Preferably, the controlled combining includes a stagewise addition of the oxidizing agent while agitating the soil to ensure thorough mixing of the oxidizing agent with the soil.

In one embodiment, the combination step is preceded by treating the $CS_2$-contaminated soil to reduce its acidity, such as by combining the soil with caustic before introducing an oxidizing agent. Sodium hydroxide (NaOH) is one preferred caustic for the pre-treatment. When a caustic is used, it should be combined with the soil such that the caustic to $CS_2$ molar ratio is from about 2:1 to about 4:1, preferably about 3:1. The pre-treatment can continue preferably not less than 24 hours, and most preferably not less than about 72 hours.

In one embodiment, the $CS_2$-contaminated soil and the oxidizing agent is combined over a period from about 10 minutes to about 60 minutes, preferably from about 15 minutes to about 45 minutes, and most preferably for a time period of about 30 minutes.

The method can also include pre-churning of the $CS_2$-contaminated soil to reduce unwanted concentrations of the $CS_2$, and preferably to provide a substantially even distribution of the $CS_2$ throughout the soil.

The oxidizing agent useful for remediating the $CS_2$ can preferably be selected from a group consisting of perborate, percarbonate, hydrogen peroxide, and combinations thereof. Preferably, the oxidizing agent to $CS_2$ molar ratio is from about 2:1 to about 12:1, more preferably from about 6:1 to about 10:1, and most preferably is about 8:1. A preferred oxidizing agent is percarbonate, and in one embodiment, the percarbonate is suspended in a slurry.

To facilitate the suspension of percarbonate, it is preferable to use an inorganic suspension agent that would not be oxidized by the oxidizing agent. The suspension agent is preferably bentonite. When the oxidizing agent is included in a slurry, the oxidizing agent content (preferably percarbonate) is preferably from about 25% to about 75%, more preferably from about 40% to about 60%, and most preferably is about 50% by weight. In a most preferred embodiment of the invention, the suspension includes percarbonate and bentonite. In the case of a percarbonate:bentonite:water slurry, the preferred ratio is about 1.00:0.05:1.00 by weight.

A further refinement of the present invention includes the possibility of a pH buffer added to the combined oxidizing agent/$CS_2$-contaminated soil. Preferably the buffer comprises substantially equal amounts of sodium carbonate and sodium bicarbonate, e.g., at a concentration of about 0.1N. Ideally the $CS_2$-contaminated soil is maintained at a pH greater than about 7.0.

The method of the present invention can be implemented by controlledly combining the components by mixing with an auger. Moreover, even pre-churning can be implemented by use of an auger.

Yet in another embodiment of the present invention, mixing can be accomplished by trenching the $CS_2$-contaminated soil while adding an oxidizing agent. This can be implemented by use of the trenching tool. In either case, the method can include adding a liquid containing the oxidizing agent to the soil during the mixing. When the liquid is a slurry, preferably it will include a mixture of percarbonate, bentonite, and water.

Yet another embodiment of the present invention includes the introduction of fluid by introducing it through conduits provided through the body of an auger. The conduits lead to ports which are formed in the mixing surface of the auger. Thus, ports are in fluid communication with a source of the fluid (e.g., slurry) by virtue of the conduits provided in the body of the auger. In this way, fluid can be introduced from the liquid source through the auger body and out the port(s) in the surface of the auger.

The present invention also includes the possibility of providing a device which increases the capacity to control off-gas. Such a device can include a collection hood located above the $CS_2$-connated soil at a distance sufficient to collect gaseous by-product. Such off-gas collections could be connected to a thermal oxidizer by fluid communication by, for example, tubing.

Furthermore, the present invention can also include post neutralization stabilization of the soil, by mixing cement with the treated soil, or by adding and mixing clean soil with the treated soil.

The amount of $CS_2$ contained in soil that reacts chemically with the oxidizing agent can be greater than about 30%, preferably greater than about 60%, and more preferably greater than about 90%. Ideally, substantially all $CS_2$ in soil gets oxidized.

As a result of the present invention, $CS_2$ can be removed from soil using an oxidizing agent while reducing the hazards associated with volatilization and, consequently, possible combustion. In fact, the concentration of $CS_2$ can be reduced to an acceptable range, which can be subsequently further neutralized by addition of an appropriate diluent.

The present invention is therefore advantageous in that it allows remediation of $CS_2$-contaminated soil in-situ without $CS_2$ contacting air, it ensures substantially complete oxidation of $CS_2$ in soil in a controlled and contained fashion so to prevent volatilization of $CS_2$, and it controls emissions of gaseous by-products from $CS_2$ oxidation.

For a better understanding of the present invention, together with other and further advantages, reference is made to the following description, taken in conjunction with accompanying drawings, and its scope will be pointed out in the appended claims.

BRIEF DESCRIPTION OF THE DRAWINGS

FIG. 2 is a diagram illustrating a side view of an injection auger.

FIG. 3 is a diagram illustrating a top view of the injection auger.

DETAILED DESCRIPTION OF INVENTION

Figure 1:
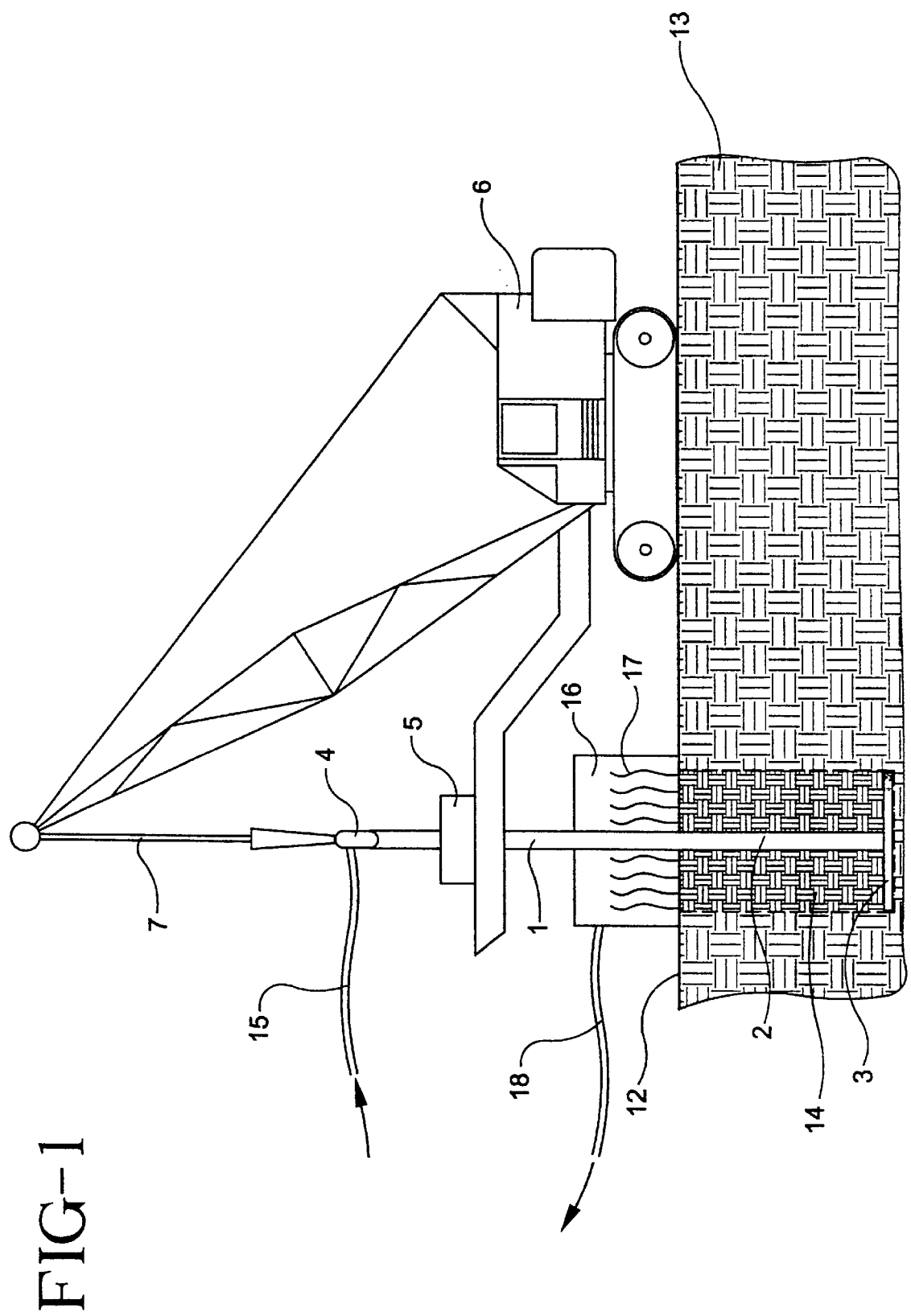
FIG. 1 is a diagram illustrating how the process of alkaline oxidation of $CS_2$ in soil can be implemented.

The present invention is a process for remediating $CS_2$-contaminated soil in-situ by use of chemical oxidizing agents. The method of the invention reduces the concentration of $CS_2$ in the soil while avoiding the risks of exposing $CS_2$ to the air. $CS_2$ can be oxidized to innocuous compounds by alkaline oxidation. The overall chemical equation is:

$$CS_2 + 6H_2O_2 + 5OH^- \rightarrow HCO_3^- + 2HSO_4^- + 2H^+ + 6H_2O$$

The present method is highly unique in that it takes advantage of readily available tools, e.g., equipment, mixing techniques, balancing chemical reactivity of the basic oxidizing equation, etc., to provide an efficient and safe modality for remediating $CS_2$ in soil without dangerous and/or unwanted side effects and without costly and unsightly excavation.

The peroxide radical, which can generally oxidize all organic compounds, is particularly useful in carrying out the oxidation of $CS_2$. Oxidizing agents used within the scope of this invention are preferably carriers of the peroxide radical. Examples of oxidizing agents include, but are not limited to, percarbonate, perborate, and hydrogen peroxide. Due to the highly exothermic nature of the alkaline oxidation using hydrogen peroxide, the more preferred oxidants are perborate and percarbonate. Furthermore, hydrogen peroxide, due to its acidity, slows down the oxidation of $CS_2$. In the most preferred embodiment of this invention, percarbonate is used. In addition to being an oxidant, percarbonate helps to neutralize acidic by-products of the reaction. Percarbonate is preferably in the form of sodium percarbonate.

The molar ratio of the oxidant to $CS_2$ is preferably in the range from about 2:1 to about 12:1, more preferably from about 6:1 to 12:1, and is most preferably about 8:1. The oxidants to be added are preferably in a solution or slurry form. If hydrogen peroxide or percarbonate is used, each is preferably mixed with water in a 50% (by weight) solution or slurry. Due to the low solubility of percarbonate, it is more preferable to suspend it in water with a suspension agent in order to maintain a concentrated oxidant slurry.

The suspension agent is preferably inorganic and chemically nonreactive to the oxidizing agent. Organic suspending agents, including salts of napthene-sulfonic acids and salts of polymeric carboxylic acids, can react with peroxide before reaching $CS_2$. Inorganic suspending agents can include, but is not limited to, bentonite. It is preferred that the percarbonate-bentonite-water ratio is from about 0.75:0.05:1.00 to about 1.00:0.07:0.50 by weight, more preferably at about 1.00:0.05:1.00.

Acidic bisulfate ions generated by the oxidation of $CS_2$ can retard the oxidation of $CS_2$ as the pH decreases. A caustic can be used to treat the soil in order to neutralize the acid and counter the decrease in pH. For purposes of this application, a working definition of "caustic" is any compound which releases a hydroxide ion, $OH^-$. The $OH^-$ provided by the caustic helps to maintain the rate of reaction and to ensure total $CS_2$ conversion of the reaction.

Any caustic or combination of caustics can be used with any oxidant or combination of oxidants. A preferred caustic is sodium hydroxide which can be introduced in a solution. The preferred concentration of caustic is about 0.1N. The molar ratio of caustic to $CS_2$ can be from about 2:1 to about 4:1, more preferably at about 3:1. The pH of the soil should be kept preferably above about 7.0. The pH of the soil after a caustic presoak can be as high as about 11. A very high pH would not deter the oxidation of $CS_2$, but it can be harmful to the soil.

The soil to be treated should be perfused as thoroughly as possible with caustic. Caustic presoaking is effective in reducing vapor production during oxidation because vapors produced during $CS_2$ oxidation contain primarily $CS_2$. This is due to the fact that a caustic will convert most of $CS_2$ contained in soil into a bisulfide intermediate. The bisulfide intermediate is a highly toxic substance. Accordingly, the oxidant is then added to oxidize the bisulfide intermediate into nontoxic bisulfate.

The sequence of adding caustic and oxidant to the $CS_2$-contaminated soil may vary. Adding only caustic would not complete the oxidation of $CS_2$, and the oxidation would be very slow at a pH of less than 10.5. The bisulfide intermediate, which is primarily produced when caustic reacts with $CS_2$, can remove hair and fingernails from one's body. It is therefore highly desirable to further remediate the bisulfide-contaminated soil by adding an oxidant to the bisulfide intermediate. In a preferred embodiment, the soil is perfused with a caustic presoak before adding the oxidant. Such caustic presoak should generally not be less than about 24 hours and preferably not less than about 72 hours. Ideally, the caustic is constantly mixed with soil throughout the caustic presoak.

The period of time during which the oxidant is controlledly combined with $CS_2$-contaminated soil is usually, but is not limited to, a period from about 10 minutes to about 60 minutes, preferably from about 15 minutes to about 45 minutes and most preferably about 30 minutes. The soil is preferably kept moist during the controlled combining. Moisture in the soil helps prevent volatilization of $CS_2$ by providing a heat sink to dissipate heat and excessive soil temperatures generated by $CS_2$ oxidation. More concentrated areas of $CS_2$ in soil generally requires a greater heat sink before adding the oxidizing agent. Moistening the soil can be accomplished by adding a liquid. The liquid can include, but is not limited to, water, caustic, water from the solution or slurry of oxidant added to the soil, or any combination thereof. It is preferred that the soil be thoroughly mixed with the liquid to better moisten the soil.

Delivery of the oxidant into the soil is controlled by adding the oxidant in a stagewise manner in order to prevent unwanted volatilization and other unwanted side effects. Too much oxidizing agent coming into contact with $CS_2$ at one time can volatilize $CS_2$. By controlling the rate reactants are added to the soil, explosions and/or conflagration can be avoided. The rate the oxidant is added into $CS_2$-contaminated soil is preferably at a constant rate until the desired molar ratio of oxidant to $CS_2$ is reached. In actual field conditions, this rate of addition can be, but is not limited to, from about 5 gallons per minute to about 50 gallons per minute. In addition, the oxidation of $CS_2$ occurs within the soil wherein substantially no $CS_2$ comes into contact with the air. The delivery of the oxidant may be achieved by direct injection or in-situ soil mixing (churning). In the preferred embodiment, in situ alkaline oxidation of $CS_2$-contaminated soil utilizes soil mixing.

Soil mixing can be done by an auger. An auger can be any mixing tool designed to mix soil and inject liquid into the soil. If desired, a trenching unit may be used in addition to the auger. Both the auger and trenching unit increase the efficiency of oxidant/$CS_2$ contact. Suitable reaction kinetics can be obtained upon reaching sufficient oxidant/$CS_2$ contact. It is preferred that the oxidant be added into the soil during the mixing of the soil.

The use of the auger and trencher for mixing soil also decreases areas of high $CS_2$ concentration in the soil. Decreasing areas of high $CS_2$ concentration in the soil can prevent explosive and flammable volatilization when oxidants contact these highly concentrated areas. It is preferred the concentrations of $CS_2$ in the soil be made substantially uniform before adding oxidants to the soil. Adding water to the soil adds a mechanical advantage to soil mixing and thereby helps create a substantially even distribution of $CS_2$ throughout the soil.

Full-scale implementation of this process can include use of a device which enables the artisan to control off-gas resulting from the process. Such a device can be, but is not limited to, an off-gas collection hood and an air pollution control device, preferably a thermal oxidizer. The off-gas collection hood is placed above the area being treated and maintained under vacuum to collect the off-gas. The off-gas collection hood can be connected to the thermal oxidizer via a flexible tube in order to maintain sufficient air flow in the off-gas collection hood and minimize air velocity in the piping. The tubing to be used can be a flexible hose. The thermal oxidizer units would provide sufficient off-gas control for gaseous by-products including, but not limited to, $CS_2$, carbonyl sulfide (COS), hydrogen cyanide (HCN), ammonia ($NH_3$), hydrogensulfide ($H_2S$) and sulfur dioxide ($SO_2$).

The auger that can be employed in the present invention is preferably an injection auger. This type of auger is adapted to add the reactants into the soil. The rate at which reactants are added to the $CS_2$-contaminated soil can be controlled by pumping reactants through the auger. The reactants are preferably delivered in a liquid medium and may be added from the ports in the mixing surface of the auger. The ports of the auger are in fluid communication with a source of reactant-containing liquid. The fluid communication is achieved by at least one passage through the auger. The liquid can contain reactants such as a caustic, an oxidizing agent or a combination thereof. An auger that can be employed is preferably an injection auger as depicted in FIGS. 2 and 3. In full-scale implementation of the invention, such an auger will preferably contain blades having about a 6 foot diameter. Preferably, the liquid is added from ports in the blades of the auger directly into the local zone of soil to be treated.

A remediating system which is particularly well suited for remediating $CS_2$ in soil by the method of the present invention utilizes an Injection Auger Unit (IAU), illustrated in accompanying FIG. 1. It should be noted that the IAU depicted in FIG. 1 is intended to be merely exemplary. The present invention can be practiced with any conventional equipment capable of combining the oxidizing agent with the $CS_2$-contaminated soil in a controlled manner according to the method of the invention.

Referring now to FIG. 1, the IAU employs an injection auger 1, having a hollow vertical shaft 2 and a plurality of mixing blades 3. The mixing blades 3 are connected to the lower end of the shaft, so that the blades 3 rotate with the shaft 2 as the shaft rotates. FIGS. 2 and 3 show a more detailed illustration of the auger. Each of the mixing blades 3 have a hollow cavity 8 which is in fluid communication with the hollow cavity of the vertical shaft 9. The mixing blades 3 also have ports 10 which allow fluid 11 to pass from the hollow cavity 8 to the area external to the mixing blades.

Referring again to FIG. 1, the top of the shaft is connected to a fitting 4, which is capable of supporting the weight of the auger 1 and allowing the auger to rotate. The fitting 4 also contains a conduit which is in fluid communication with the hollow cavity of the vertical shaft 9. A crane 6 is employed to support the weight of the fitting 4 and the auger 1 and to control the height of the mixing blades 3 relative to the surface of the soil 12. A cable 7 from the crane 6 is attached to the fitting 4 and is used to support and adjust the height of the auger. The vertical shaft 2 also passes through a means for rotating the auger 5, which is capable of rotating the auger 1 over a range of mixing blade heights, including about 15 feet or more below the surface of the soil 12.

Once the location of the $CS_2$-contaminated soil to be remediated is determined, the auger 1 is raised to a position so that the mixing blades 3 are above the surface of the $CS_2$-contaminated soil 12. The crane 6 is positioned so that the mixing blades 3 are above the area of soil to be remediated. The auger 1 is rotated by the means for rotating the auger 5 and the auger is lowered into the soil 13 allowing the mixing blades 3 to mix the soil in contact with the blades 14. The oxidizing agent is added to the $CS_2$-contaminated soil in the form of an aqueous solution or slurry at the same time the soil is being mixed by the mixing blades 3. The oxidizing agent is pumped through a flexible hose 15, which is connected to the fitting 4 and which is in fluid communication with the conduit contained in the fitting. The oxidizing agent passes through the conduit in the fitting, through the hollow cavity of the vertical shaft 9, through the hollow cavities 8 in the mixing blades and out through the ports 10 of the mixing blades into the surrounding soil which is in contact with the blades 14. Preferably, the soil can be pretreated with a caustic by adding it to the soil in a similar manner as with the oxidizing agent. In addition, a collection hood 16 is placed over the area of soil being treated to collect off-gases 17 which are produced from the reaction between the oxidizing agent and the $CS_2$-contaminated soil. The collection hood 16 is maintained under vacuum and is connected by a flexible hose 18 to a thermal oxidizer. The off-gas is transported to the thermal oxidizer via the flexible hose 18, where it is converted into non-hazardous materials.

It is preferable to stabilize soils that have been treated according to the present method, and the inventive process can include a stabilization step. Treated soil can result in extremely soft soil columns with virtually no bearing capacity. To achieve stabilization, cement may be mixed with the treated soil with an excavator. It is preferable that clean soil be added in addition to the cement to enhance stabilization. About 7 to 9 wt % cement can be added to the top four feet of treated soil. For treated soil on top of shallow water tables, it is preferred that the top six to eight feet of the treated soil use 20 to 25 wt % cement.

This inventive process of remediating $CS_2$-contaminated soil can be used for remediating different kinds of earth matter of various compositions and consistencies. Percarbonate could routinely provide up to 99% removal of $CS_2$ in actual field conditions.

The following examples have been set forth below as a guide to the practitioner, and are not meant in any way to limit the scope of the present invention.

EXAMPLES

In the following examples, $CS_2$ contaminated soil is subjected to various oxidants through various experiments. The results which identify the percent reduction of $CS_2$ and off-gas analysis are outlined below.

Example 1

A $CS_2$-contaminated soil sample containing approximately 30,000 ppm $CS_2$ was treated with an oxidant as follows: A 500 gram sample of the $CS_2$-contaminated soil was tested to determine the initial concentration of $CS_2$ in the soil. The initial concentration of $CS_2$ in soil was determined using high performance liquid chromatography (HPLC). This sample was placed in a 2 liter glass reaction kettle. A 50 wt % solution of percarbonate was added to the kettle until a percarbonate:$CS_2$ ratio of 8:1 molar equivalence was reached. The reaction began at 20° C. and was allowed to reach an equilibrium value. The resulting mixture was continuously stirred by a mechanical mixer and the reaction kettle was kept gas-tight. After about 30 minutes, the resulting mixture was analyzed to determine the concentration of $CS_2$. Off-gas $CS_2$ concentration was analyzed after about 30 and 60 minutes. The concentration of $CS_2$ remaining in soil was determined by HPLC and the amount of $CS_2$ in the off-gas was determined by mass spectroscopy (MS). The results are listed in Table 1 below.

Example 2

A $CS_2$-contaminated soil sample containing approximately 30,000 ppm $CS_2$ was treated with an oxidant as follows: A 500 gram sample of the $CS_2$-contaminated soil was tested to determine the initial concentration of $CS_2$ in the soil. The initial concentration of $CS_2$ in soil was determined using HPLC. The sample of $CS_2$-contaminated soil was placed in a glass reaction kettle and treated by adding a 50 wt % solution of peroxide and a 0.1 NaOH solution so that the reaction mixture contained a NaOH:$CS_2$ ratio of 3:1 molar equivalence and a peroxide:$CS_2$ ratio of 8:1 molar equivalence. The reaction conditions were the same as in Example 1. The results are listed in Table 1 below.

Example 3

A $CS_2$-contaminated soil sample containing approximately 30,000 ppm $CS_2$ was treated with an oxidant as follows: A 500 gram sample of the $CS_2$-contaminated soil was tested to determine the initial concentration of $CS_2$ in the soil. The initial concentration of $CS_2$ was determined by HPLC. The sample of $CS_2$-contaminated soil was placed in a glass reaction kettle and treated by adding a 50 wt % solution of percarbonate and a 0.1 NaOH solution so that the reaction mixture simultaneously contained a NaOH:$CS_2$ ratio of 3:1 molar equivalence and a percarbonate:$CS_2$ ratio of 8:1 molar equivalence. The reaction conditions were the same as in Example 1. The results are listed in Table 1 below.

TABLE 1

| Measured compound | Control: No Treatment | Simultaneous Caustic/ Peroxide | Percarbonate only | Simultaneous Caustic/ Percarbonate |
|---|---|---|---|---|
| $CS_2$ in soil (mg/kg) | 37000 | 1200 | Not Detectable | 1.2 (J) |

TABLE 1-continued

| Measured compound | Control: No Treatment | Simultaneous Caustic/ Peroxide | Percarbonate only | Simultaneous Caustic/ Percarbonate |
|---|---|---|---|---|
| $CS_2$ (off-gas) PPMV* | NA | 40200/16100 | 41200/8530 | 20300/4410 |

Notes:
*Off-gas results indicates results in 30 minutes and 60 minutes.
(J) Estimated value; the result is less than quantitation limits but greater than zero.

Example 4

A $CS_2$-contaminated soil sample containing approximately 30,000 ppm $CS_2$ was treated with an oxidant as follows: A 500 gram sample of the $CS_2$-contaminated soil was tested to determine the initial concentration of $CS_2$ in the soil. The initial concentration of $CS_2$ in soil was determined using HPLC. This sample was placed in a 2 liter glass reaction kettle. The sample was presoaked for 72 hours at room temperature by adding 0.1N NaOH until aNaOH:$CS_2$ molar ratio of 3:1 was obtained. The soil was continuously mixed by a mechanical mixer throughout the presoak. A 50 wt % solution of percarbonate was added to the kettle until a percarbonate:$CS_2$ ratio of 8:1 molar equivalence was reached. The reaction began at 20° C. and was allowed to reach an equilibrium value. The resulting mixture was continuously stirred by a mechanical mixer and the reaction kettle was kept gas-tight. After about 30 minutes, the resulting mixture was analyzed to determine the concentration of $CS_2$. Off-gas $CS_2$ concentration was analyzed after about 30 and 60 minutes. $CS_2$ concentration in soil was determined by HPLC and $CS_2$ concentration in gas was determined by MS. The results are listed in Table 2 below.

Example 5

A $CS_2$-contaminated soil sample containing approximately 30,000 ppm $CS_2$ was treated with an oxidant as follows: A 500 gram sample of the $CS_2$-contaminated soil was tested to determine the initial concentration of $CS_2$ in the soil. The concentration of $CS_2$ in soil was determined by HPLC. This sample was placed in a 2 liter glass reaction kettle. The sample was presoaked by adding 0.1 NaOH under the same conditions as Example 4. A 50 wt % solution of peroxide was then added to the kettle until a peroxide:$CS_2$ ratio of 8:1 molar equivalence was reached. The reaction conditions were the same as Example 4. After about 30 minutes, the resulting mixture was analyzed to determine the concentration of $CS_2$. Off-gas $CS_2$ concentration was analyzed after about 30 and 60 minutes. The results are listed in Table 2 below.

TABLE 2

| Measured compound | Control: Caustic Soak | Caustic Soak/ Percarbonate | Caustic Soak/ Peroxide |
|---|---|---|---|
| $CS_2$ in soil (mg/kg) | 1200 | 0.93 (J) | 77 |
| $CS_2$ (off-gas) PPMV* | NA | 1300/1450 | 4120/130 |

Notes:
*Off-gas results indicates results in 30 minutes and 60 minutes.
(J) Estimated value; the result is less than quantitation limits but greater than zero.

A review of Tables 1 and 2 reveals that caustic presoaking was most effective in reducing $CS_2$ vapor production during $CS_2$ oxidation. The results further show that substantially all $CS_2$ was oxidized when using percarbonate as an oxidant and that percarbonate is more effective in oxidizing $CS_2$ in soil than peroxide.

Example 6

Full scale testing was performed using an injection auger unit (IAU) similar to the IAU depicted in FIG. 1, to evaluate the reduction of $CS_2$-contaminated soil for a range of initial $CS_2$ concentrations. The initial concentration of $CS_2$ was determined from a sample of approximately 500 grams of $CS_2$-contaminated soil. A geoprobe was used to obtain the sample from the zone of soil to be treated and the sample was preserved in methanol. The initial concentration of $CS_2$ in soil was determined by HPLC. The $CS_2$-contaminated soil was treated by adding a slurry containing a percarbonate-:bentonite:water ratio of 1.00:0.50:1.00 by weight. The slurry was added to the soil by pumping it through the injection auger at a constant rate for about 30 minutes, while continuously mixing the soil with the auger, until the molar ratio of percarbonate to $CS_2$ was about 11:1. The volume of soil treated ranged from about 4 feet to about 12 feet below grade. After about 30 minutes, a sample of approximately 500 grams of the treated soil was taken by a trier type sampler and preserved in methanol. $CS_2$ concentration in the treated soil was determined using HPLC. This test was repeated 144 times for $CS_2$-contaminated soil having varying initial concentrations of $CS_2$. The initial $CS_2$ concentration, total weight of percarbonate used and percent of initial $CS_2$ oxidized are listed in Table 3 below for 12 randomly selected tests.

TABLE 3

[11:1 Molar Ratio of Oxidant to $CS_2$]

| Test Number | Pretreatment Concentration $CS_2$ (mg/kg) | Pounds Percarbonate | % Removal |
|---|---|---|---|
| 1 | 2206 | 905 | 94.5% |
| 2 | 2785 | 1141 | 91.4% |
| 3 | 2770 | 1134 | 97.1% |
| 4 | 2388 | 980 | 92.1% |
| 5 | 420 | 173 | 82.5% |
| 6 | 1688 | 691 | 89.1% |
| 7 | 2072 | 849 | 98.1% |
| 8 | 2036 | 834 | 97.6% |
| 9 | 1000 | 409 | 99.6% |
| 10 | 2326 | 954 | 65.3% |
| 11 | 7419 | 3054 | 99.9% |
| 12 | 2326 | 954 | 82.5% |

A review of Table 3 reveals that substantially all $CS_2$ initially in the treated soil was oxidized. However, there was combustion observed in some of the experiments. The median reduction using the 11:1 molar ratio was about 91%.

Example 7

Example 6 was repeated for 510 additional test samples, but using only a 9:1 molar ratio of percarbonate to $CS_2$. The results of 12 randomly selected tests are listed in Table 4 below.

TABLE 4

[9:1 Molar Ratio of Oxidant to CS$_2$]

| Test Number | Pretreatment Concentration CS$_2$ (mg/kg) | Pounds Percarbonate | % Removal |
|---|---|---|---|
| 1 | 1405 | 578 | 99.7% |
| 2 | 2088 | 704 | 99.8% |
| 3 | 2088 | 704 | 94.5% |
| 4 | 3101 | 1045 | 97.1% |
| 5 | 3101 | 1045 | 99.9% |
| 6 | 3110 | 1048 | 97.6% |
| 7 | 3110 | 1048 | 95.8% |
| 8 | 8202 | 2764 | 99.3% |
| 9 | 1000 | 337 | 85.6% |
| 10 | 8158 | 2760 | 100% |
| 11 | 1000 | 337 | 86.3% |
| 12 | 1990 | 671 | 89.2% |

A review of Table 4 reveals that substantially all CS$_2$ in the soil was oxidized. There was no combustion observed in any of the experiments. The median reduction using the 9:1 molar ratio was about 95%.

Comparing the results of Tables 3 and 4, i.e. 11:1 and 9:1 molar ratios, there was no significant difference in the percent reduction of CS$_2$ between the two, and the variability in CS$_2$ reduction between the two was essentially the same. The median percent reduction of CS$_2$ in soil was about 94% and the maximum was 100%.

Figure 4:
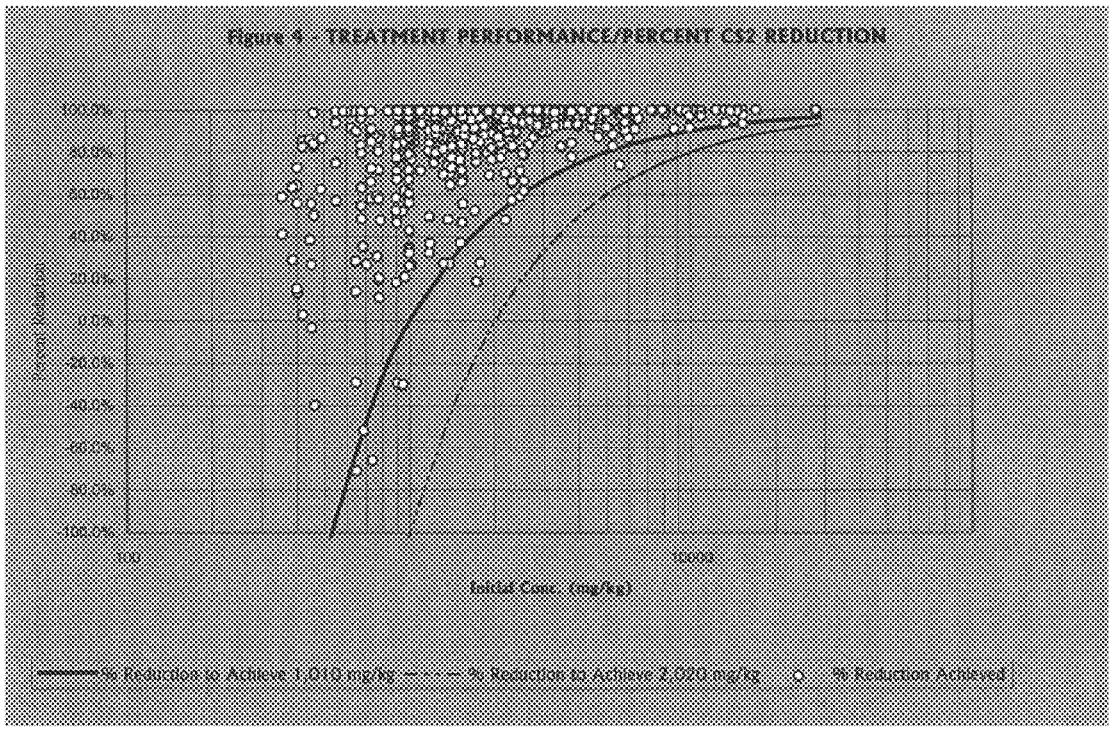
FIG. 4 is a graph showing the percent of $CS_2$ reduction for a given initial concentration of $CS_2$.

FIG. 4 is a graph in which the results of all 654 runs using the 9:1 and 11:1 molar ratios are reported. The broken line represents the percent reduction of CS$_2$ concentration in the soil required in order to have no more than the highest permissible concentration of 2020 mg/kg of CS$_2$ remain in the soil. The solid line represents the desired percent reduction of CS$_2$ concentration in the soil in order to reach a more preferable goal of having no more than 1010 mg/kg of CS$_2$ remain in the soil. The graph shows surprisingly excellent results for most tests regardless of the initial concentration of CS$_2$ in the soil. Some anomalous results showing a negative reduction of CS$_2$ in soil also appear which are not statistically significant and are deemed trivial.

Thus, while there have been described herein what are presently believed to be the preferred embodiments of the present invention, those skilled in the art will realize that changes and modifications may be made thereto without departing from the spirit of the invention, and it is intended to claim all such changes and modifications as fall within the true scope of the invention.

What is claimed is:

1. A method of remediating CS$_2$ in soil by an in situ chemical reaction comprising:
   controlledly combining CS$_2$-contaminated soil with an oxidizing agent without substantial contact with air such that CS$_2$ contained in the soil is drawn proximal to said oxidizing agent sufficient to react chemically therewith; and
   further controlling the in situ chemical reaction to prevent substantial vaporization or combustion of the CS$_2$ or CS$_2$ by-products.

2. A method according to claim 1 wherein said controlled-combining comprises stagewise addition of said oxidizing agent during agitation of said soil to ensure thorough mixing of said oxidizing agent with said soil.

3. A method according to claim 1 wherein said controlled combining further comprises pre-treating said CS$_2$-contaminated soil to reduce acidity.

4. A method according to claim 3 wherein said pretreatment comprises soaking said CS$_2$-contaminated soil with caustic before combining with said soil.

5. A method according to claim 4 wherein said caustic is NaOH.

6. A method according to claim 5 wherein caustic to CS$_2$ molar ratio is from about 2:1 to about 4:1.

7. A method according to claim 6 wherein caustic to CS$_2$ molar ratio is about 3:1.

8. A method according to claim 4 wherein said pretreatment continues for not less than 24 hours.

9. A method according to claim 8 wherein said pretreatment is not less than about 72 hours.

10. A method according to claim 1 wherein said controlled combining is conducted for a time period of from about 10 minutes to about 60 minutes.

11. A method according to claim 10 wherein said time period is from about 15 minutes to about 45 minutes.

12. A method according to claim 11 wherein said time period is about 30 minutes.

13. A method according to claim 1 which further comprises pre-churning said CS$_2$ contaminated soil to reduce unwanted concentrations of CS$_2$.

14. A method according to claim 13 wherein said pre-churning provides substantially even distribution of said CS$_2$ throughout said soil.

15. A method according to claim 1 wherein said oxidizing agent is selected from the group consisting of perborate, percarbonate and hydrogen peroxide.

16. A method according to claim 13 wherein oxidizing agent to CS$_2$ molar ratio is from about 2:1 to about 12:1.

17. A method according to claim 16 wherein said molar ratio is from about 6:1 to about 10:1.

18. A method according to claim 17 wherein said molar ratio is about 8:1.

19. A method according to claim 15 wherein said oxidizing agent is percarbonate.

20. A method according to claim 19 wherein said percarbonate is suspended in a solution using a suspension agent.

21. A method according to claim 20 wherein said solution is an aqueous slurry having a percarbonate content of from about 25% to about 75% by weight.

22. A method according to claim 21 wherein said percarbonate content is from about 40% to about 60% by weight.

23. A method according to claim 22 wherein said percarbonate content is about 50% by weight.

24. A method according to claim 20 wherein said suspension agent is bentonite.

25. A method according to claim 24 wherein said suspension comprises a ratio of percarbonate:bentonite:water of about 1.00:0.05:1.00 by weight.

26. A method according to claim 1 wherein a pH buffer is also added to said CS$_2$-contaminated soil and said oxidizing agent during said combining step.

27. A method according to claim 26 wherein said buffer comprises substantially equal volumes of 0.1 N sodium carbonate and 0.1 N sodium bicarbonate.

28. A method according to claim 1 wherein said CS$_2$-contaminated soil is maintained at a pH greater than about 7.0.

29. A method according to claim 1 wherein said controlled combining comprises mixing with an auger.

30. A method according to claim 13 wherein said pre churning comprises mixing with an auger.

31. A method according to claim 29 wherein said mixing further comprises trenching said $CS_2$-contaminated soil.

32. A method according to claim 29 wherein a liquid containing said oxidizing agent is introduced into said soil during said mixing.

33. A method according to claim 32 wherein said liquid is a slurry comprising a mixture of percarbonate, bentonite and water.

34. A method according to claim 32 wherein said liquid is introduced from ports in a mixing surface of an auger, said ports being in fluid communication with a source of said liquid.

35. A method according to claim 34 wherein said fluid communication is provided by at least one passage through said auger.

36. A method according to claim 1 further comprising a device that increases off-gas control capacity, said device comprising an off-gas collection hood located above said $CS_2$-contaminated soil at a distance sufficient to collect gaseous by-products, said off-gas collection hood connected to a thermal oxidizer by tubing.

37. A method according to claim 1 further comprising stabilization of treated soil after said controlled combining, said stabilization comprising mixing cement with said treated soil.

38. A method according to claim 37 wherein said stabilization further comprises adding clean soil.

39. A method according to claim 1 wherein more than about 30% of said $CS_2$ contained in said soil reacts chemically with said oxidizing agent.

40. A method according to claim 1 wherein more than about 60% of said $CS_2$ contained in said soil reacts chemically with said oxidizing agent.

41. A method according to claim 1 wherein more than about 90% of said $CS_2$ contained in said soil reacts chemically with said oxidizing agent.

42. A method according to claim 1 wherein substantially all of said $CS_2$ contained in said soil reacts chemically with said oxidizing agent.

* * * * *

UNITED STATES PATENT AND TRADEMARK OFFICE
CERTIFICATE OF CORRECTION

PATENT NO. : 6,283,675 B1  
DATED : September 4, 2001  
INVENTOR(S) : Dulcey et al.

Page 1 of 1

It is certified that error appears in the above-identified patent and that said Letters Patent is hereby corrected as shown below:

<u>Title page,</u>
Item [12], the printed patent incorrectly reads "Dulsey et al.". The patent should read -- Dulcey et al. --.
Item [75], the printed incorrectly reads "Rich Dulsey, Drefher, PA". The patent should read -- Rich Dulcey, Dresher, PA --.

Signed and Sealed this

Ninth Day of April, 2002

Attest:

JAMES E. ROGAN  
*Attesting Officer*     *Director of the United States Patent and Trademark Office*